April 25, 1933.  W. BAUER  1,905,432
MANUFACTURE OF HYDROGEN CHLORIDE OR HYDROGEN BROMIDE
OR THEIR CORRESPONDING ACID SOLUTIONS
Filed May 27, 1929
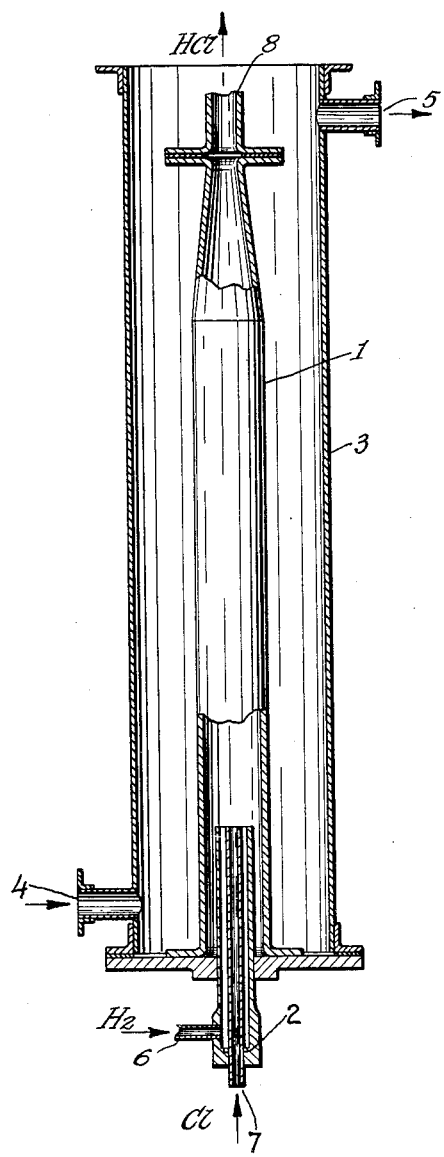
INVENTOR.
WALTER BAUER.
BY
ATTORNEY.

Patented Apr. 25, 1933

1,905,432

UNITED STATES PATENT OFFICE

WALTER BAUER, OF DARMSTADT, GERMANY, ASSIGNOR TO ROHM & HAAS AKTIENGE-SELLSCHAFT, OF DARMSTADT, GERMANY, A CORPORATION OF GERMANY

MANUFACTURE OF HYDROGEN CHLORIDE OR HYDROGEN BROMIDE OR THEIR CORRESPONDING ACID SOLUTIONS

Application filed May 27, 1929, Serial No. 366,537, and in Geramny June 2, 1928.

My invention relates to improvements in or relating to the manufacture of hydrogen chloride or hydrogen bromide or their corresponding acid solutions by combination of the halogen elements with hydrogen.

For the production of halogen acids from their elements burners have hitherto been employed which consisted of acid and fireproof fused silicic acid or its compounds.

The present invention consists in a method of manufacturing hydrogen chloride or hydrogen bromide or their corresponding acid solutions by combination of the halogen elements with hydrogen, in which I use a resistant metal burner through which the reacting gases are passed with a sufficiently great velocity i. e. approximately 450 grams of halogen per hour per square millimeter to avoid reaction of the gases or of the products with the metal of the burner.

According to the present invention I also provide an apparatus for use in the manufacture of hydrogen chloride or hydrogen bromide or their corresponding acid solutions in which the burner employed is made of resistant metal.

In the method and apparatus according to this invention it is furthermore preferable to employ an externally cooled combustion or reaction chamber made of metal so that the apparatus can be constructed entirely of metal. In the production of hydrochloric acid it has previously been proposed to employ metal chambers, but in such cases it was necessary either to keep the combustion temperature low by the use of catalysts or to employ a gas as far as possible free from oxygen.

The cooling of the chambers is preferably such that an undesirable effect of the combustion process or of the products in the metal chamber is avoided. The heat evolved by the reaction and absorbed by the cooling medium may be employed for any suitable heating purposes.

On the annexed drawing I have shown by way of illustration, a sectional view of an apparatus, in accordance with my invention.

On the drawing, 1 denotes the combustion chamber, while the burner is shown at 2.—3 is the cooling jacket surrounding the combustion chamber; the cooling medium, e. g. water etners at 4 and leaves at 5.—At 6 is shown the hydrogen inlet, while 7 denotes the inlet for the chlorine, and 8 the outlet for the hydrogen chloride.

In the practice of the invention any suitable resistant metal such as copper, or its alloys, or lead, may be employed for the construction of the burner, and if desired also for the chamber, or different metals may be employed for the two parts. Thus, for example the burner may be constructed of copper and the chamber of lead.

In a preferred method of carrying out the invention, a cylindrical combustion chamber of lead is employed. This chamber is externally cooled by means of circulating water as in the apparatus shown on the drawing which is so circulated as to leave the apparatus at a temperature of about 80° C. Under these conditions the combustion gases are correspondingly cooled to approximately 80° C. If desired the cooling water may be allowed to leave the apparatus at a temperature higher than 80° C., or if desired, other media, such as steam may be employed as cooling fluid.

By the term "external cooling" as used in the specification is meant cooling by means outside and not forming part of the reaction, but does not necessarily mean that the cooling means are actually outside the combustion chamber. Thus the cooling means might for example comprise coils or tubes disposed within the combustion chamber having a cooling medium circulated therethrough.

I claim:

1. The method of manufacturing hydrogen compounds of the intermediate halogens in the halogen series, or their corresponding acid solutions by a combination of the halogen elements with hydrogen which consists in passing the reacting gases through a resistant metal burner at a velocity of about 450 grams of halogen per hour per square millimeter to prevent reaction of the gases or their products with the metal burner.

2. The method of manufacturing hydrogen chloride, or its corresponding acid solution by a combination of the halogen elements with hydrogen which consists in passing the reacting gases through a resistant metal burner at a sufficient velocity to prevent reaction of the gases or their products with the burner, and then passing the gases into a combustion chamber also made of resistant metal while at the same time cooling said chamber.

3. The method as specified in claim 2, in which the combustion gases are cooled to approximately 80° C.

4. The method of manufacturing hydrogen compounds of the intermediate halogens in the halogen series or their corresponding acid solutions by a combination of the halogen elements with hydrogen, which consists in passing the reacting gases through a burner of copper containing metal at a velocity of about 450 grams of halogen per hour per square millimeter to thereby prevent reaction of the gases or their products with the burner.

5. The method of manufacturing hydrogen chloride or its corresponding acid solution by a combination of the halogen elements with hydrogen, which consists in passing the reacting gases through a burner of copper at a velocity of about 450 grams of halogen per hour per square millimeter to thereby prevent reaction of the gases or their products with the burner, and then passing the gases into a combustion chamber made of lead while at the same time cooling said chamber.

6. The method of manufacturing hydrogen chloride or its corresponding acid solution by a combination of the halogen elements with hydrogen, which consists in passing the reacting gases through a burner of copper at a velocity of about 450 grams of halogen per hour per square millimeter to thereby prevent reaction of the gases or their products with the burner, and then passing the gases into a combustion chamber made of copper while at the same time cooling said chamber.

In testimony whereof I affix my signature.

WALTER BAUER.